No. 882,644. PATENTED MAR. 24, 1908.
H. H. MACOMBER.
WINDMILL.
APPLICATION FILED JAN. 9, 1907.
2 SHEETS—SHEET 2.
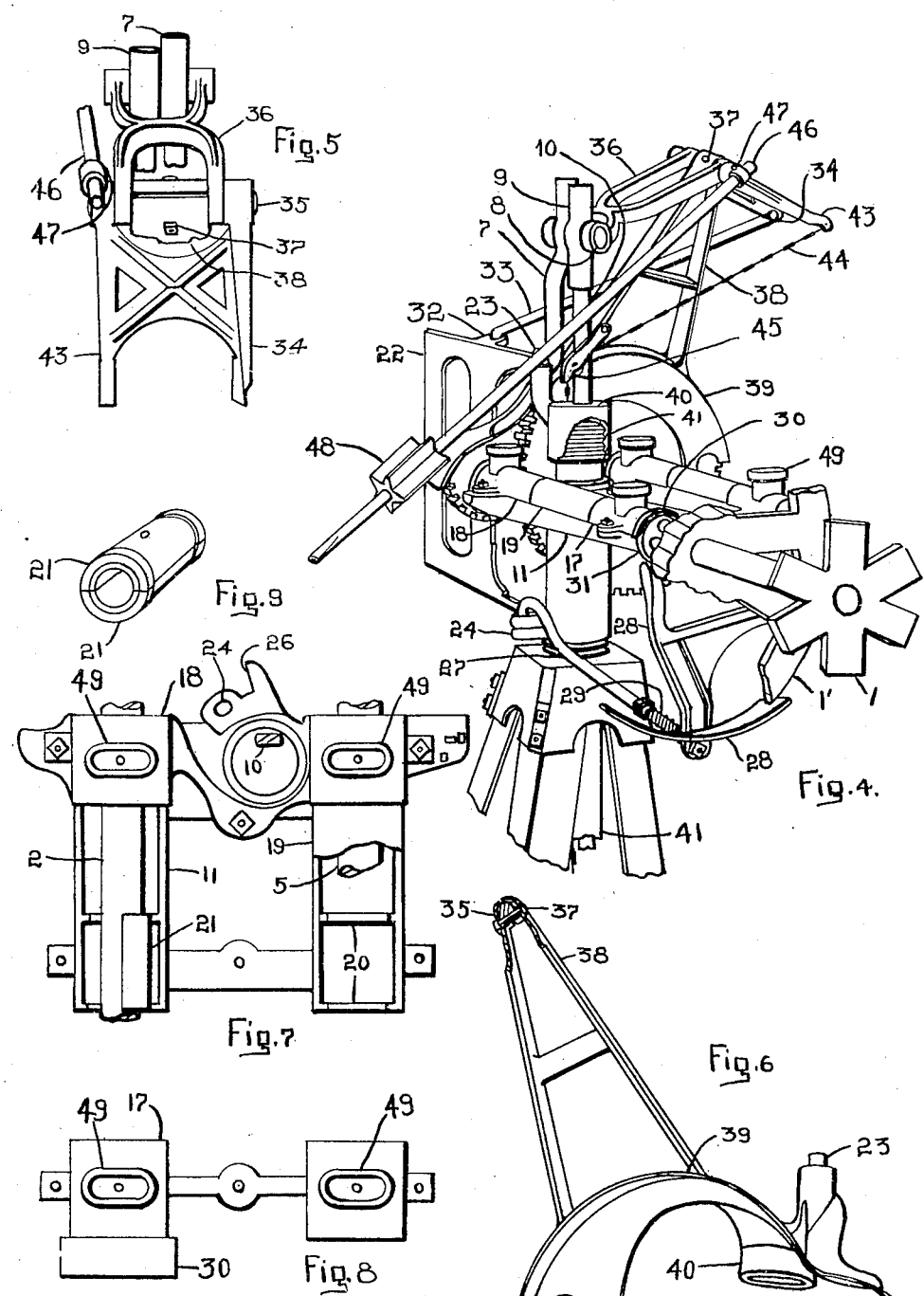
WITNESSES
Hazel Kirk
M. E. Kirk
Herbert H Macomber
INVENTOR
By Geo E Kirk
ATTORNEY

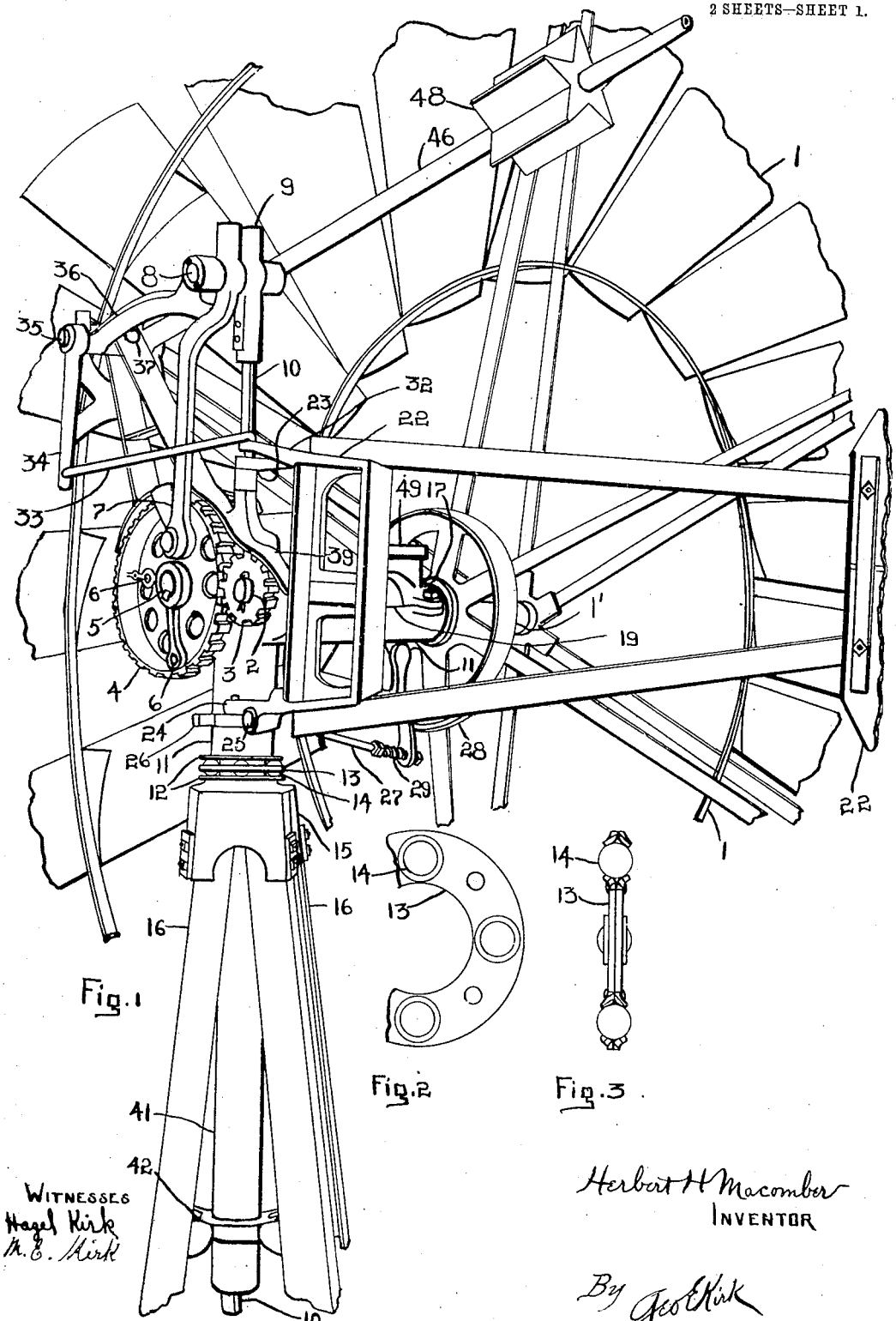

UNITED STATES PATENT OFFICE.

HERBERT H. MACOMBER, OF KENDALLVILLE, INDIANA, ASSIGNOR TO FLINT & WALLING MANUFACTURING COMPANY, OF KENDALLVILLE, INDIANA, A CORPORATION OF INDIANA.

WINDMILL.

No. 882,644.

Specification of Letters Patent.

Patented March 24, 1908.

Application filed January 9, 1907. Serial No. 351,422.

*To all whom it may concern:*

Be it known that I, HERBERT H. MACOMBER, a citizen of the United States, residing at Kendallville, in the county of Noble and State of Indiana, have invented a new and useful Windmill, of which the following is a specification.

This invention relates to a rigid windmill construction in which, with a minimum of resistance, the movement of parts is accurately and positively controlled.

This invention has utility especially in back-geared windmills, the great features of advantage being easy running combined with avoidance of all connections and adjustments liable to work loose. This is brought about by so designing the coöperating elements that, while offering the least possible resistance as a source of power, they are maintained in the determined assembled relation by other means than set screws or similar devices which might under strain and vibration permit play. Accordingly there is produced not only a machine of maximum efficiency but one of great durability.

Referring to the drawings: Figure 1 is a perspective view, with parts broken away of an embodiment of the invention in a windmill of the back-geared type; Fig. 2 is a fragmentary view of the swivel washer; Fig. 3 is a sectional view of the swivel washer; Fig. 4 is a perspective view, with parts broken away of a windmill from the opposite side to that shown in Fig. 1; Fig. 5 is a view looking down on the governor-shifting arm bracket and walking beam; Fig. 6 is a detail view in elevation of combined fulcrum, gear cover, stem-sustaining unit; Fig. 7 is a plan view of the swivel support for the shafts, parts being removed to more plainly show how the shafts are held in place; Fig. 8 is a plan view of one of the holding caps; and Fig. 9 is a perspective view of two-piece bushing such as a cap engages to hold the shaft.

The windwheel 1 has the flanged spider 1'. The windwheel 1 is fixed to one end of shaft 2, which shaft at its opposite end carries pinion 3, of the back-gearing or speed reducing train, which meshes with rotatable member or gear wheel 4 fixed to shaft 5. The gear wheel 4 has a plurality of crank pin sockets 6 at different radial distances from its center, permitting adjustment of the stroke of driving pitman 7, which through pin 8 has pivotal connection with block 9 of the reciprocable driven or pump rod 10. The rod 10 is on the opposite side of the wheel 4 to that on which the pitman is connected, and the pitman 7 is bent or has an angular extension bringing its stroke into line with the stroke of the rod 10.

Carrying the shafts 2 and 5 is the support 11 having a tubular portion, at the base of which is a pair of circular wear plates 12 having interposed between them the double ring washer 13. This swivel washer comprises two pieces of sheet metal having registering openings somewhat dished into which balls 14 are assembled, when the plates or rings are riveted together to complete the anti-friction swivel. The lower wear plate 12 rests upon the mounting or tower 16.

To hold the shafts 2 and 5 in position in the support 11, independently removable caps 17 and 18 are provided. The caps are spaced apart, and when in position, engage to hold between them the shields 19. In the support 11 at each capped portion are ways 20, on which fit and are slidable the half bushings 21. For the four capped portions eight half bushings are required, all of which are alike, and accordingly interchangeable. The ways 20 are so formed as to accurately aline the wear bushings 21. In assembling or refitting, while each cap section covers two sets of bushings, the removal of a cap section leaves each shaft held in place by the other cap section. Accordingly in this construction the bushings 21 may be slipped around to interchange, or be replaced without disturbing the shafts 2 or 5. With heavy parts in elevated positions, where entire loosening invites derangement by wind, this structure has great advantages. In Fig. 7 a half bushing 21 is shown half slid out of position about shaft 2. As so designed the shafts may be cared for with ease, accuracy and certainty.

The rudder 22 has pivotal connection 23 with upper portion of the frame or stem sustaining unit, and pivotal connection 24 with the lower or tubular portion of support 11. The rudder 22 carries the cushioning buffer 25, which in the limit of movement of the rudder in turning the wheel 1 into the wind comes into contact with projection 26 carried by support 11, thus avoiding excessive shock to the structure.

Connected to the opposite side of the rudder 22 from buffer 25 is rod 27, engaging brake shoe 28 mounted below the shaft holding portion of support 11. Movement of rod 27 as the windwheel is swung out of the wind, is transmitted through spring 29 to yieldingly apply the brake shoe 28 to the flange brake surface of braking member or spider 1'. This action of the brake has a tendency to lift the windwheel 1, and so sustaining an increased friction surface, to stop rotation, instead of tending to twist the structure or pull the shaft out of position. Movement of the rudder 22 to throw the wheel into action, positively, through rod 27, pulls brake shoe 28 to free the spider.

When in action, the wind tends to move the windwheel 1 and its shaft 2 into the support 11. Accordingly under the shield 30 of cap 17 is placed a washer 31 of the character shown in Figs. 2 and 3. The spider 1' and shield 30 are partially broken away in Fig. 4 to more clearly show the washer 31. Reduction of friction at this point as well as in the swivel, not only make the mill readily responsive, but add greatly to the efficiency of the machine.

The rudder is controlled through connection at arm 32 with rod 33, engaging the bracket having shifting arm 34. This bracket is mounted on pin 35, as is also the doubly forked walking beam or guide 36, which at its opposite end engages pin 8. This guide 36 having spaced pivotal connections at each end is rigid against twisting strains, and by embracing the pitman 7 and pump rod 10 so confines their movement that a maximum of effective effort is transmitted with a minimum of liability for getting out of true for the parts.

The pin 35 is clamped and keyed by the bolt 37 in the fulcrum frame 38. As shown in Figs. 5 and 6, the fulcrum 38 is split to form a clamp. The downwardly extending bolt 37 engages a recessed portion of the shaft, as shown in Fig. 6, so that on tightening up the bolt it simultaneously clamps and keys rod or pin 35.

Integral with fulcrum 38 is the gear cover 39 extending as a shield over pinion 3 and gear wheel 4. This unit frame 38, 39, has an internally threaded tubular portion 40, which in the assembled construction is alined with the tubular portion of the support 11. Firmly screwed and expanded into this portion 40 is the stem 41 which extends through the tubular portion of support 11, and through the swivel into the mounting 16 and truing spider or guide 42. This connection of the stem 41 to its supporting frame is above the plane of the shafts 2 and 5, and owing to its remoteness from the swivel and above shaft 2, as well as having some freedom relative to support 11, the great strains localized near the swivel do not affect the stem connection. Accordingly there is no liability of the stem working loose and the mill toppling over.

The shifting arm 34 is integral with the governor arm 43, they together forming a bracket pivotally mounted on fixed pin 35. Connected to arm 43 remote from its mounting is flexible connection 44, extending over guide 45 and through stem 41 with the pump rod 10. By actuating this connection the rudder 22 may be pulled out of gear, that is, to turn the windwheel out of the wind. Release of the connection will permit the rudder to guide the wheel back into the wind.

On arm 43 adjacent its pivot is mounted the governor pipe or stem 46, being held in position by the downwardly extending bolt 47, which engages a cutaway portion of the stem 46, as does the bolt 37 engage the cutaway portion of pin 35 shown in Fig. 6. Adjustably mounted on the stem 46 is the governor weight 48, which in regular operation tends to so hold the rudder as to keep the wheel 1 toward the wind.

Over each set of bushings 21 and in the detachable caps are oil cups 49.

The stem 41, in extending through support 11 and the swivel, has a snug fit, and while strains on the stem are taken up by movement in support 11, these movements are so slight as to not affect the mechanism carried by the fulcrum 38 of the upper frame unit. This frame unit, as shown, rests upon, and in the assembled structure is so fitted as to maintain proper relation to, the support 11. This construction of the machine permits such a distribution of the working stresses and strains that they do not operate to in any way injure the assembled relation of the mechanism.

The idea of the invention herein disclosed is not to be limited by the drawings and description to any greater extent than the ordinary meaning of the terms of the claims demand. In other words, the elements set forth in the claims are to be interpreted broadly, giving me the advantage of equivalents in the protection of my idea.

What is claimed and it is desired to secure by Letters Patent is:

1. A windmill comprising a rotatable member, a pitman connected to the member, a reciprocable rod, a forked walking beam embracing the pitman and rod to prevent lateral or twisting movements, and a common pivot connection between the pitman, the rod and the walking beam.

2. A windmill comprising a swiveled support, a pivoted rudder mounted on the support, a forked one-piece pivoted bracket carried by the support, a link directly connecting the rudder and one arm of the bracket, and a flexible member connected to the other arm of the bracket and extending through the swivel support.

3. A windmill comprising a mounting, a swiveled support thereon having a bearing, a shaft mounted in the bearing, a windwheel to drive the shaft, a stem sustaining frame carried by the support and movable relatively thereto, and a stem connected to the frame and extending into the support and mounting to hold the support in position.

4. A windmill comprising a windwheel, a shaft therefor, a swiveled support for the shaft, a double-ring washer interposed between the wheel and support having registering dished portions and balls therein, and a shield for the washer.

5. A windmill comprising a windwheel, a shaft therefor, a swiveled support for the shaft, a mounting for the support, a double ring washer interposed between the support and mounting, having registering dished portions and balls therein, and a stem extending from the support into the mounting to hold the support in position on the mounting.

In testimony whereof I affix my signature in the presence of two witnesses.

HERBERT H. MACOMBER.

Witnesses:
 ALBERT H. MINOR,
 E. J. ROMMES.